United States Patent
Gerngroß et al.

(10) Patent No.: US 12,224,639 B2
(45) Date of Patent: Feb. 11, 2025

(54) ROTOR FOR AN EXTERNALLY EXCITED SYNCHRONOUS MACHINE

(71) Applicant: AUDI AG, Ingolstadt (DE)

(72) Inventors: Martin Gerngroß, Kinding (DE); Lars Wetterau, Ingolstadt (DE)

(73) Assignee: AUDI AG, Ingolstadt (DE)

(*) Notice: Subject to any disclaimer, the term of this patent is extended or adjusted under 35 U.S.C. 154(b) by 223 days.

(21) Appl. No.: 17/895,856

(22) Filed: Aug. 25, 2022

(65) Prior Publication Data

US 2023/0063773 A1    Mar. 2, 2023

(30) Foreign Application Priority Data

Aug. 26, 2021   (DE) .......................... 102021122066.1

(51) Int. Cl.
*H02K 3/52* (2006.01)
*H02K 3/18* (2006.01)

(52) U.S. Cl.
CPC ............... *H02K 3/527* (2013.01); *H02K 3/18* (2013.01); *H02K 3/522* (2013.01)

(58) Field of Classification Search
None
See application file for complete search history.

(56) References Cited

U.S. PATENT DOCUMENTS

| | | | |
|---|---|---|---|
| 8,269,393 B2* | 9/2012 | Patel | H02K 3/527 310/194 |
| 10,056,806 B2* | 8/2018 | Hatfield | H02K 9/227 |
| 10,630,127 B1* | 4/2020 | Thomasson | H02K 3/24 |
| 2018/0337569 A1 | 11/2018 | Lee | |
| 2018/0375410 A1* | 12/2018 | Moser | H02K 3/522 |

FOREIGN PATENT DOCUMENTS

| | | |
|---|---|---|
| DE | 102006021903 A1 | 11/2007 |
| DE | 102017214776 A1 | 4/2018 |
| DE | 112016006082 T5 | 9/2018 |
| DE | 102018128521 A1 | 5/2020 |
| DE | 102020118944 A1 | 1/2022 |
| DE | 102021101814 A1 | 7/2022 |

* cited by examiner

*Primary Examiner* — Bernard Rojas
(74) *Attorney, Agent, or Firm* — Seed IP Law Group LLP

(57) ABSTRACT

A star disc has integrated current busbars for the interconnecting of rotor windings. A rotor may comprise the star disc, and a method may comprise producing the rotor.

10 Claims, 2 Drawing Sheets

ROTOR FOR AN EXTERNALLY EXCITED SYNCHRONOUS MACHINE

BACKGROUND

Technical Field

Embodiments of the present invention relate to a star disc having integrated current busbars for the interconnecting of rotor windings, a rotor comprising the star disc, and a method for producing the rotor.

Description of the Related Art

The active part of an electrical machine basically consists of a stationary part, the stator, and a moving part, the rotor. In the stator there are conductors which generate a rotating magnetic field by suitable energization. Thanks to an electromagnetic interaction with the rotor, the stator exerts a force on the rotor, resulting in its movement. There are various machine principles for this. The usual ones are the asynchronous machine (ASM), the permanently excited synchronous machine (PESM) and the externally excited synchronous machine (EESM).

The externally excited synchronous machine (EESM) is an alternative to the permanently excited synchronous machine (PESM) without a magnet for the propulsion of an electrified vehicle. The magnets of the PESM which are located in the rotor are replaced by current-conducting copper windings, which generate the torque-producing rotor-magnetic field like an electromagnet.

The copper windings of the rotor consist of a standard enameled wire. These windings are wound on the rotor poles. For efficiency reasons and power reasons, one tries to wind as many windings as possible in the available cross sectional surface. For this reason, an orthocyclic winding is the goal, corresponding to the tightest hexagonal arrangement of the wires, as this allows the greatest possible packing density due to the 60° offset between wires of two layers.

The winding body of an EESM rotor is composed of multiple components. The central component is the laminated stack, mounted on a shaft. The copper wires, after being wound, run in the grooves of the laminated stack. In order to deflect the wire coils in the area of the winding heads, there are two star discs arranged at the end faces of the laminated stack. The star discs have a contour designed for mechanical supporting of the wire coils. The star discs may consist entirely of plastic. In order to increase the strength, a metal core can also be used. The basic metal body in such components is encased in plastic.

The winding of the rotor consists of concentric coils, each one arranged around the poles. As a rule, the rotor comprises 6 poles, but there may also be a different number of poles present, such as 8 poles. The structure is based on a trapezoidal winding construction, in order to fill the spaces between the poles with as much copper as possible. In this way, a high degree of copper filling and thus a high efficiency and power density of the electric machine can be achieved. All of the partial windings shown are constructed one after the other in series with a single continuous wire.

One challenge occurring in the case of a trapezoidal winding construction is that the last winding of a pole winding never ends at the bottom on the yoke. The first winding lies against the yoke at the bottom. After this, the winding is constructed layer by layer. The last winding ends at the top on the pole shoe and not at the bottom on the yoke. However, a pole change is always only possible at the bottom on the yoke. Since a pole change can only occur at the bottom, the wire needs to be led back to the yoke. From the standpoint of the rotor, this return movement occurs in the direction of the shaft from radially outward to inward. A connection of the individual poles is then possible at the yoke. There are different techniques for leading the wire back from the pole shoe to the yoke:

First, a return is possible using special contours in the star disc. These brace the wire and allow it to run diagonally across the winding head. The precise implementation is described by German patent application DE 10 2020 118 944.3.

On the other hand, the wire can be led back from the pole shoe to the yoke by a special winding scheme. Specially designed gaps or omissions in the winding brace the wire during its return. The precise implementation is described by German patent application DE 10 2021 101 814.5.

US 2018/0337569 A1 discloses a rotor assembly having a rotor core, around which coils are wound; and a busbar with terminals, which are connected to the coils, and a body which is arranged on the rotor core and connected to the terminals and which comprises a plurality of vanes. The body comprises an inner body, an outer body, and connection pieces, the outer body being situated outside the inner body, and the connection pieces being arranged at regular intervals in a circumference of the inner body and connecting the inner body to the outer body. The terminals are arranged in the inner body such that connecting ends of the terminals are arranged between the adjacent connection pieces, and the vanes protrude from a top surface of the outer body and are arranged at regular intervals in a circumferential direction relative to a center of rotation. The outer body has a cooling hole, running from its lower surface to its upper surface. The cooling hole is situated between adjacent vanes.

From DE 11 2016 006 082 T5 there is known a structure of an electrical connection piece, a rotor and a motor on which this structure is used, as well as a method for forming an electrical connection piece. In the structure of an electrical connection piece, a terminal of a current-conducting part of a motor and a winding are thermally coupled. The terminal has a detent piece located at the side with the base end and a fusible piece situated at the top side. The winding comprises a winding piece which is wound on the detent piece and one end of this is connected to a melt bead created on the fusible piece, as well as a connection wire, which is stretched from a main winding piece of the motor and follows the other end of the winding piece. No tension acts on the one end of the winding piece to pull the connection wire toward the main winding piece.

DE 10 2017 214 776 A1 relates to a method for fabricating a rotor for an electric machine with noncontact power transmission system, having a winding head cover arranged at one end face of a laminated stack of the rotor. A secondary unit (SEC) of the power transmission system is integrated in the winding head cover and through this the secondary unit (SEC) once the winding head cover has been put in place is held indirectly through the winding head cover on the rotor.

BRIEF SUMMARY

Some embodiments provide devices and methods which can be used for the production of externally excited synchronous machines with high efficiency and power density.

Some embodiments include a star disc for a rotor of an externally excited synchronous machine, wherein at least the surface of the star disc consists of plastic, in which current busbars are embedded, each of them connecting in electrically conducting manner a pole shoe or a groove of the star disc to an adjacent pole shoe or an adjacent groove of the star disc and having at their two ends a contacting element to accommodate a winding wire protruding from the surface of the star disc.

Current busbars are integrated in the star disc to lead back the conductors in a trapezoidal winding. The current busbars are embedded for example by injection molding in the star disc. Then the return of the conductor from the pole shoe to the yoke no longer occurs through standard winding wire, as in all other windings, but instead through a current busbar. Thus, the function of the return guidance is shifted to the star disc. At the two ends of the current busbars there are contacting elements, each of which produces a connection between the winding and the current busbar. The poles of the star disc additionally serve for the wire guidance and the wire bracing. The specifically defined outer contour of the poles with the support structures enables a robust winding process. The contacting elements constitute the intersections between a wound coil and the current busbars. Support contours are integrated in the star disc for the wire guidance between the coil and the contacting elements. The electrical connection between current busbar and wire can then be produced for example by welding.

In one embodiment, current busbars for the connection of the trapezoidal winding of the individual poles lead from the pole shoe to the yoke. In another embodiment, current busbars lead from the pole shoe to the yoke and again to a further pole shoe, and thus connect one pole shoe to another one. In one embodiment, the current busbars are arranged such that they enable a free connecting of the trapezoidal winding at the individual poles of a rotor. In one embodiment, the current busbars are arranged such that they allow a winding of all poles with the same direction of rotation and at the same time make possible parallel current directions in the grooves of the star disc.

For an EESM rotor, a serial interconnecting of all the windings is the standard. Each time, a winding consists of multiple single wires. In order to generate a homogeneous magnetic field, the currents in the windings on both sides of a groove between two adjacent poles must flow in the same direction. Proper current directions must be assured by the interconnection of the poles. Thanks to the use of current busbars, various schemes can be implemented for the interconnection of the coils. The current busbars encased in the star disc interconnect the individual windings in series, while the current directions in a groove point each time in the same direction.

Thanks to the use of the current busbars for the return guidance in trapezoidal windings, several advantages result for the product properties and for the production process of an EESM. By doing away with the return guidance of the wire through the winding itself, there are no wire intersections or chords in the area of the winding head. This results in better stability of the winding as compared to implementations known thus far. Also, thanks to the use of current busbars, there are no connection wires between the coils.

One embodiment of the star disc comprises current busbars which lead from one pole shoe back to the yoke and on to the pole shoe of the clockwise adjacent pole. In one embodiment, a star disc for a six-pole rotor has 3 types of current busbars, all poles being wound with the same winding direction. In another embodiment, adjacent poles are wound in the opposite winding direction.

Thanks to the use of the current busbars from pole shoe to pole shoe, more design freedom is gained for the component. Thanks to the function integration in the star disc, the required design space is significantly decreased and thus it can be utilized for other functions. This variant furthermore has the benefit that the current busbars can be injection molded free of crossings in the plastic of the star disc. Thus, the size of the potential differences in closely situated conductors can be significantly decreased. A totally regular and orthocyclic winding can also be implemented. The orthocyclic winding can be built up layer by layer. There are no irregularities due to omissions or due to the jumping back of individual windings.

Some embodiments include a rotor of an externally excited synchronous machine, comprising at least one star disc as described herein. The star discs are arranged on a rotor axis at opposite end faces of a laminated stack of the rotor. In one embodiment, the rotor comprises a star disc as described herein at one end face of the laminated stack and a conventional star disc without current busbars at the opposite end face of the laminated stacks. In another embodiment, the rotor comprises two star discs as described herein at opposite end faces of the laminated stack, while the current busbars needed for the contacting of the windings are distributed on the two star discs. Trapezoidally orthocyclic windings are arranged on the poles of the star discs and the laminated stack.

Some embodiments include a method for producing a rotor of an externally excited synchronous machine. In the method, two star discs are arranged at the end faces of a laminated stack of the rotor, wherein at least one of the two star discs is a star disc as described herein, and the poles of the star discs and the laminated stack are wound with a winding wire to form a trapezoidally orthocyclic winding.

Thanks to the use of current busbars in the star disc, the winding of one pole ends at the top on the pole shoe. Unlike the variants of wire return guidance known at present, the last turn of the winding need not be placed on the yoke at the bottom. Thus, for the last turn, the wire guide does not need to dip into the groove as far as its bottom. Consequently, less free space needs to be maintained between two windings of adjacent poles during the winding process. Thanks to a so-called fulcrum shift, the wire nozzle can travel closer to the pole being currently wound during the winding process. Therefore, the required free space is diminished. This, in turn, can be filled with additional copper wires. The increase in the copper fill factor so achieved directly brings with it an increased power density for the rotor.

In one embodiment of the method, the winding direction is the same for all the poles. This significantly simplifies the fabrication process, since purely identical pieces are produced. A reversal of the current direction can be achieved with the course of the current busbars. This would not be possible in a continuous winding with an uninterrupted wire. Thanks to splitting up the coils, the sequence of the pole winding can be chosen freely. In this way, mechanical stresses in the winding process can be reduced. In one embodiment of the method, the winding of opposite poles is done directly in succession. This results in a more uniform stress on the component in the production process. Thus, the buckling of the shaft in one direction due to a one-sided stress can be effectively counteracted. In another embodiment, there is a simultaneous winding of multiple poles. The process times can thus be significantly reduced by using multiple wire guides. This is not possible in a continuous winding process with an uninterrupted wire.

For a maximum utilization of the available design space, the EESM requires a trapezoidal winding window. A very high copper fill factor can be achieved thanks to an orthocyclic winding layout in the groove. With a high copper fill factor, the efficiency of the machine can be increased. The efficiency is one of the most important features of an electric machine. The higher the efficiency of the machine, the larger the travel range of the vehicle for the same battery capacity. The winding ends here not on the yoke at the bottom, but rather on the pole shoe at the top. For this reason, a return guidance of the wire on the inside is not necessary in any case. Thanks to the return guidance of the wire and the connection of the wound coils, maximum copper fill degrees can be achieved. The current busbars make it possible to put even more copper in the available design space, since the free space between two windings can be reduced. The connection of the coils through current busbars in the area of the winding head makes it possible to lead the wire radially back in the direction of the shaft, without having unnecessary crossings in the groove. This is the prerequisite for a stable winding and a secure guidance of the connection wires during the process. A secure fabrication concept for the return guidance of the wires is a basic requirement for the use of the EESM technology in large scale production. Thanks to the method described herein, a significant cost savings for the fabrication can also be expected.

The use of the described current busbars furthermore offers the advantage that the winding direction can be the same for all the poles. Unlike previous methods, it is then possible to wind, for example, six identical coils, so that the complexity of the layouts and the winding process decreases significantly. Thanks to a simultaneous winding of multiple poles, a reduction in the production time per rotor is possible. The simultaneous winding of two opposite poles makes it possible for example to cut in half the run-through time. Further benefits and embodiments will emerge from the description and the accompanying drawings.

Of course, the above mentioned features and those yet to be explained in the following can be used not only in the particular indicated combination, but also in other combinations or standing alone, without leaving the scope of the present disclosure.

DETAILED DESCRIPTION

Figure 1:
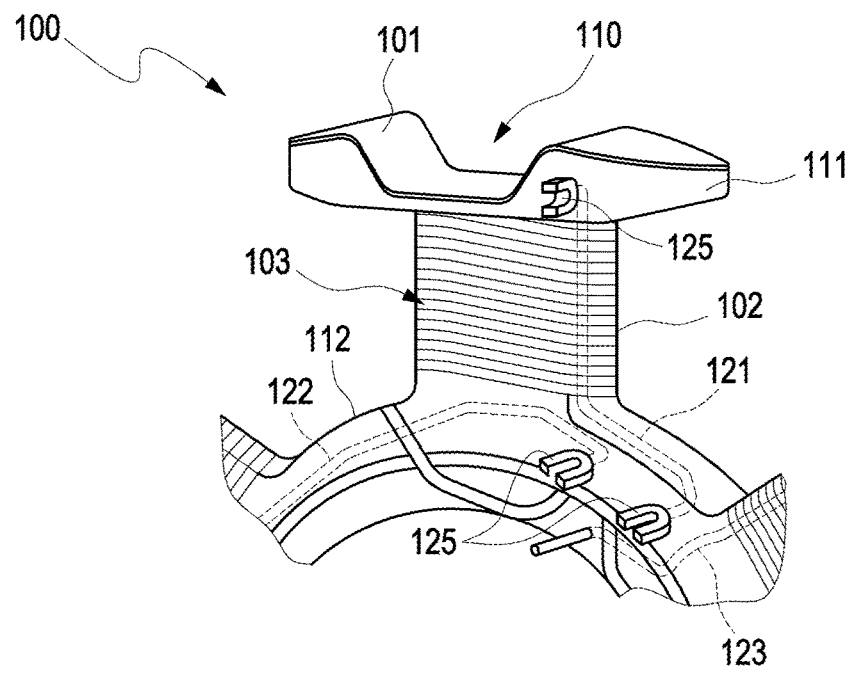
FIG. 1 shows a partial view of one embodiment of the star disc described herein.

FIG. 1 shows a partial view of one embodiment of the star disc 100. The cutout encompasses one of the six poles 110 of the star disc 100 with pole shoe 111, as well as the adjacent yokes 112. The star disc 100 comprises a metal core 101 with a plastic casing 102, which can be obtained for example by overcasting the metal core 101. The plastic casing 102 comprises support structures 103, which brace and guide a winding wire and thus facilitate the building of a regular wire winding on the poles 110 of the star disc 100. The precisely defined outer contour enables a robust winding process. Current busbars 121, 122, 123 are embedded in the plastic casing 102 and at the ends of these there are contacting elements 125 to receive a winding wire. The contacting elements 125 each time produce an electrically conductive connection between the winding and the current busbar.

Figure 2:
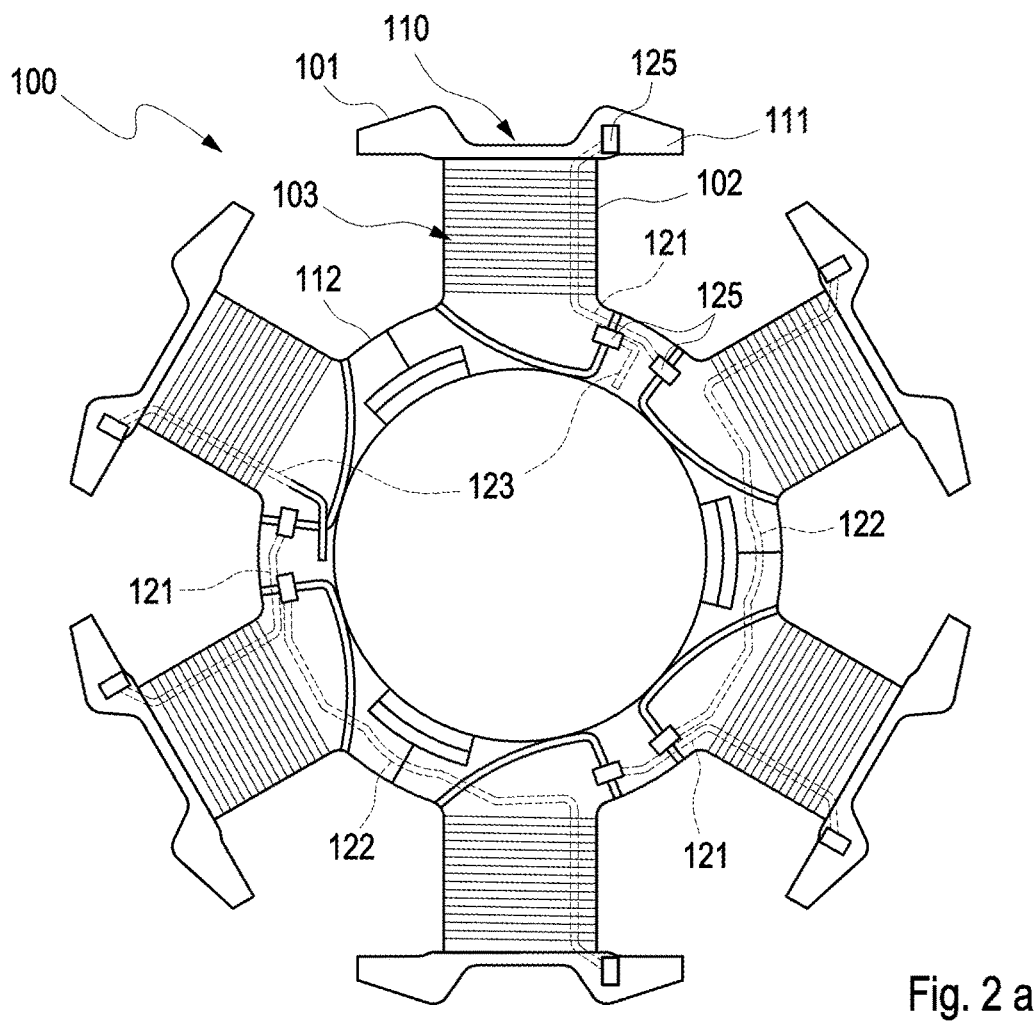
FIGS. 2a and 2b show two embodiments of the star disc described herein.
Figure 2:
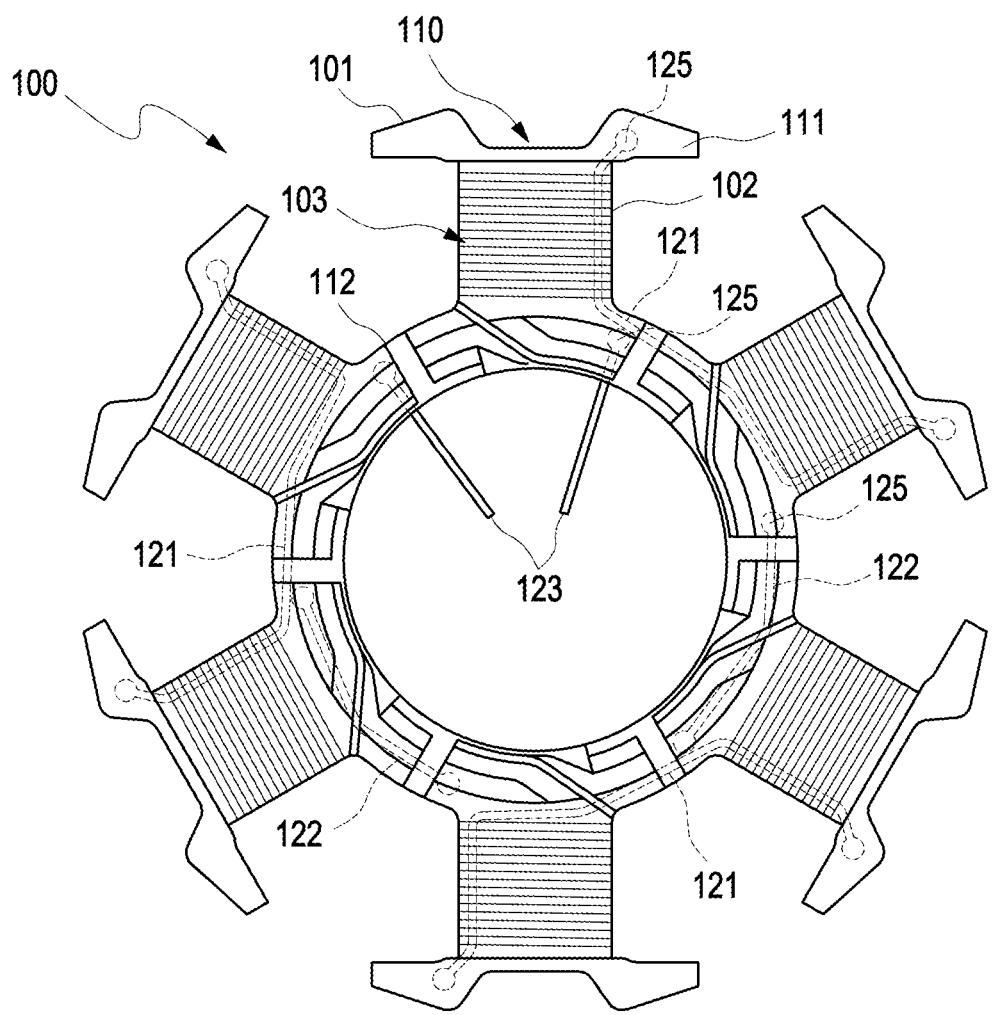

FIGS. 2a and 2b show two embodiments of the star disc 100 with different arrangements of the current busbars 121, 122, 123.

In the embodiment shown in FIG. 2a, the current busbars 121 each time connect the pole shoe of a pole to the foot of the clockwise adjacent pole. The current busbars 122 connect the pole shoe of a pole to the foot of the second next clockwise adjacent pole. The current busbars 123 produce the terminal for the power supply.

In the embodiment shown in FIG. 2b, the current busbars 121 each time connect the pole shoe of one pole to the pole shoe of the clockwise adjacent pole, and thus run from the pole shoe back to the yoke and on to the pole shoe of the adjacent pole. The current busbars 122 connect the foot of one pole to the foot of the clockwise adjacent pole. The current busbars 123 produce the terminal for the power supply.

The current busbars 121, 122, 123 encased in the star disc 100 interconnect the individual windings at the poles of the star disc 100 in series. The current directions in a groove each time point in the same direction. For the example shown of a six-pole rotor, one thus gets 3 types of current busbars if all poles are wound each time with the same winding direction. For the example shown, there is always a winding in the clockwise direction.

Figure 3:
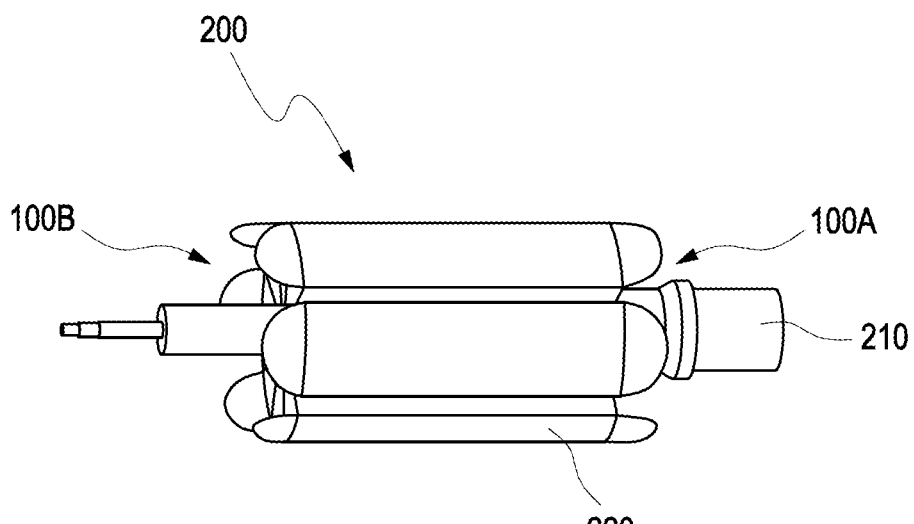
FIG. 3 shows one embodiment of the rotor as described herein.

FIG. 3 shows an embodiment of a rotor 200. On the rotor shaft 210 there is arranged a laminated stack 220 with six poles. Star discs 100 A, 100 B are arranged at the end faces of the laminated stack 220, one conventional star disc 100 A without embedded current busbars on the A-side of the rotor 200 and a star disc 100 B on the B-side of the rotor 200. The wires of the rotor winding are led across the star discs 100 A, 100 B and the poles of the laminated stack 220. The winding is not shown in the drawing.

German patent application no. 10 2021 122066.1, filed Aug. 26, 2021, to which this application claims priority, is hereby incorporated herein by reference, in its entirety. Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A star disc for a rotor of an externally excited synchronous machine, comprising:
   a surface of the star disc that is formed of plastic, in which current busbars are embedded,
   the current busbars connecting in electrically conductive manner a pole shoe or a groove of the star disc to an adjacent pole shoe or an adjacent groove of the star disc, and
   the current busbars extending to a radially outward free end of a respective pole of the star disc opposite a base end of the pole and including, at their two ends respectively, a contacting element to receive a winding wire protruding from the surface of the star disc.

2. The star disc according to claim 1, wherein the current busbars are embedded by injection molding in the star disc.

3. The star disc according to claim 1, wherein the poles of the star disc comprise support structures for guiding and bracing of a winding wire.

4. The star disc according to claim 1, wherein at least one current busbar leads from the pole shoe of at least one pole to a yoke of the star disc adjacent to the pole.

5. The star disc according to claim 1, wherein at least one current busbar leads from the pole shoe of at least one pole to the pole shoe of a pole of the star disc which is clockwise adjacent to the pole.

6. The star disc according to claim 1, wherein at least one current busbar leads from the foot of at least one pole to the foot of a clockwise adjacent pole of the star disc.

7. The star disc according to claim 1, wherein the current busbars are arranged such that they allow a winding of all poles with the same direction of rotation and at the same time make possible parallel current directions in the grooves of the star disc.

8. A rotor of an externally excited synchronous machine, comprising:
   two star discs, which are arranged on a rotor axis at opposite end faces of a laminated stack of the rotor,
   wherein at least one of the two star discs is a star disc including:
   a surface of the star disc that is formed of plastic, in which current busbars are embedded,
   the current busbars connecting in electrically conductive manner a pole shoe or a groove of the star disc to an adjacent pole shoe or an adjacent groove of the star disc, and
   the current busbars extending to a radially outward free end of a respective pole of the star disc opposite a base end of the pole and including, at their two ends respectively, a contacting element to receive a winding wire protruding from the surface of the star disc.

9. A method for producing a rotor of an externally excited synchronous machine, comprising:
   arranging two star discs at opposite end faces of a laminated stack of the rotor, and
   winding the poles of the star discs and the laminated stacks with a winding wire to form a trapezoidally orthocyclic winding,
   wherein at least one of the two star discs is a star disc including:
   a surface of the star disc that is formed of plastic, in which current busbars are embedded;
   the current busbars connecting in electrically conductive manner a pole shoe or a groove of the star disc to an adjacent pole shoe or an adjacent groove of the star disc, and
   the current busbars extending to a radially outward free end of a respective pole of the star disc opposite a base end of the pole and including, at their two ends respectively, a contacting element to receive a winding wire protruding from the surface of the star disc.

10. The method according to claim 9, in which multiple poles of the rotor are wound at the same time and in the same winding direction.

\* \* \* \* \*